United States Patent
Bodnaruk et al.

(10) Patent No.: US 10,901,487 B2
(45) Date of Patent: Jan. 26, 2021

(54) POWER SUPPLY ARCHITECTURE FOR USB-C CONTROLLERS

(71) Applicant: Cypress Semiconductor Corporation, San Jose, CA (US)

(72) Inventors: Nicholas Alexander Bodnaruk, Sunnyvale, CA (US); Anup Nayak, Fremont, CA (US); Pavan Kumar Kuchipudi, San Jose, CA (US)

(73) Assignee: Cypress Semiconductor Corporation, San Jose, CA (US)

( * ) Notice: Subject to any disclaimer, the term of this patent is extended or adjusted under 35 U.S.C. 154(b) by 0 days.

(21) Appl. No.: 16/691,270

(22) Filed: Nov. 21, 2019

(65) Prior Publication Data
US 2020/0174546 A1    Jun. 4, 2020

Related U.S. Application Data

(63) Continuation of application No. 16/139,974, filed on Sep. 24, 2018, now Pat. No. 10,503,240.

(60) Provisional application No. 62/721,347, filed on Aug. 22, 2018, provisional application No. 62/674,326, filed on May 21, 2018.

(51) Int. Cl.
| | |
|---|---|
| *G06F 13/38* | (2006.01) |
| *G06F 1/3234* | (2019.01) |
| *G06F 13/42* | (2006.01) |
| *G06F 1/26* | (2006.01) |

(52) U.S. Cl.
CPC ............ *G06F 1/3253* (2013.01); *G06F 1/266* (2013.01); *G06F 13/385* (2013.01); *G06F 13/4282* (2013.01); *G06F 2213/0042* (2013.01)

(58) Field of Classification Search
CPC ................ G06F 1/3253; G06F 13/385; G06F 2213/0042; G06F 1/266
See application file for complete search history.

(56) References Cited

U.S. PATENT DOCUMENTS

| | | | |
|---|---|---|---|
| 9,400,546 B1 | 7/2016 | Agarwal et al. | |
| 10,324,877 B2* | 6/2019 | Forghani-Zadeh | ... G06F 13/385 |
| 10,503,240 B1* | 12/2019 | Bodnaruk | ........... G06F 13/4282 |
| 10,713,184 B2* | 7/2020 | Rand | ..................... G06F 1/3253 |
| 2017/0344098 A1 | 11/2017 | Hilal | |
| 2019/0319447 A1* | 10/2019 | Mukhopadhyay | .. G06F 13/4081 |

OTHER PUBLICATIONS

International Search Report for International application No. PCT/US19/28778 dated Jun. 20, 2019, 2 pages.

(Continued)

*Primary Examiner* — Raymond N Phan

(57) ABSTRACT

In an example embodiment, a Universal Serial Bus Type-C (USB-C) cable comprises a respective integrated circuit (IC) controller, disposed at each end of cable, that is coupled to a respective VCONN line at that end of the cable. Each IC controller comprises a power rail, a VDDD terminal, a VBUS terminal, and a VCONN terminal that is coupled to the VCONN line at the respective end of the cable. The VDDD terminal, the VCONN terminal, and the VBUS terminal are coupled to the power rail. The power rail is coupled to internal circuits of the IC controller and is configured to provide operating power to the internal circuits of the IC controller from the its VCONN terminal.

10 Claims, 9 Drawing Sheets

(56) References Cited

OTHER PUBLICATIONS

USPTO Non-Final Rejection for U.S. Appl. No. 16/139,974 dated Mar. 7, 2019, 18 pages.
USPTO Notice of Allowance for U.S. Appl. No. 16/139,974 dated Aug. 15, 2019, 5 pages.
Written Opinion of the International Searching Authority for International application No. PCT/US19/28778 dated Jun. 20, 2019, 8 pages.

* cited by examiner

POWER SUPPLY ARCHITECTURE FOR USB-C CONTROLLERS

PRIORITY

This application is a continuation of U.S. Non-provisional application Ser. No. 16/139,974, filed on Sep. 24, 2018, which claims the priority and benefit of U.S. Provisional Application No. 62/674,326, filed on May 21, 2018 and U.S. Provisional Application No. 62/721,347, filed on Aug. 22, 2018, all of which are incorporated by reference herein in their entirety.

TECHNICAL FIELD

This disclosure relates to integrated circuits (ICs) that control Universal Serial Bus (USB) power delivery to electronic devices.

BACKGROUND

Various electronic devices (e.g., such as smartphones, tablets, notebook computers, laptop computers, chargers, adapters, power banks, etc.) are configured to transfer power through USB connectors according to USB power delivery protocols defined in various versions and revisions of the USB Power Delivery (USB-PD) specification. For example, in some applications an electronic device may be configured as a power consumer to receive power through a USB connector (e.g., for battery charging), while in other applications an electronic device may be configured as a power provider to provide power to another device that is connected thereto through a USB connector. The USB-PD specification defines at least three different voltage supplies: VBUS (e.g., 3V-22.5V, for powering various USB functions), VCONN (e.g., 3.0V-5.5V, for powering a USB Type-C chip), and a local battery supply (e.g., 2.0V-5.5V, for powering internal on-chip circuitry). Thus, electronic device manufacturers typically use different types of IC controllers that are powered from different power supplies depending on the different designs and/or applications of their USB-enabled electronic devices.

BRIEF DESCRIPTION OF THE DRAWINGS

FIG. 5A illustrates one end of the cable and FIG. 5B illustrates the other end of the cable.

DETAILED DESCRIPTION

Figure 1:
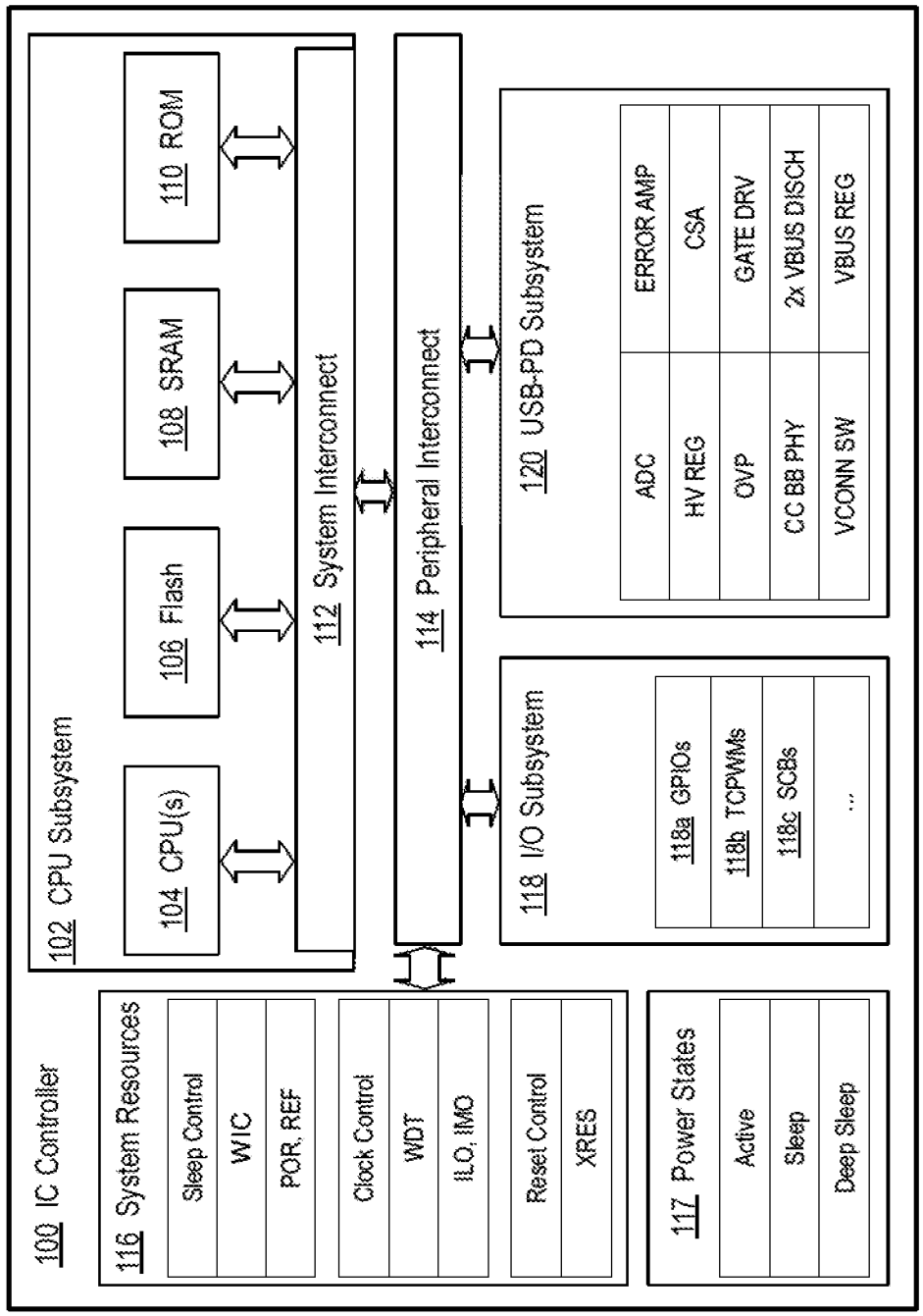
FIG. 1 illustrates an on-die IC controller with a USB-PD subsystem in accordance with example embodiments.

The following description sets forth numerous specific details such as examples of specific systems, components, methods, and so forth, in order to provide a good understanding of various embodiments of the power supply architecture for USB Type-C controllers described herein. It will be apparent to one skilled in the art, however, that at least some embodiments may be practiced without these specific details. In other instances, well-known components, elements, or methods are not described in detail or are presented in a simple block diagram format in order to avoid unnecessarily obscuring the subject matter described herein. Thus, the specific details set forth hereinafter are merely exemplary. Particular implementations may vary from these exemplary details and still be contemplated to be within the spirit and scope of the present invention.

Reference in the description to "an embodiment", "one embodiment", "an example embodiment", "some embodiments", and "various embodiments" means that a particular feature, structure, step, operation, or characteristic described in connection with the embodiment(s) is included in at least one embodiment of the invention. Further, the appearances of the phrases "an embodiment", "one embodiment", "an example embodiment", "some embodiments", and "various embodiments" in various places in the description do not necessarily all refer to the same embodiment(s).

The description includes references to the accompanying drawings, which form a part of the detailed description. The drawings show illustrations in accordance with exemplary embodiments. These embodiments, which may also be referred to herein as "examples", are described in enough detail to enable those skilled in the art to practice the embodiments of the claimed subject matter described herein. The embodiments may be combined, other embodiments may be utilized, or structural, logical, and electrical changes may be made without departing from the scope and spirit of the claimed subject matter. It should be understood that the embodiments described herein are not intended to limit the scope of the subject matter but rather to enable one skilled in the art to practice, make, and/or use the subject matter.

Described herein are various embodiments of a power supply architecture in USB Type-C controllers that can be disposed to operate in various electronic devices. Examples of such electronic devices include, without limitation, personal computers (e.g., laptop computers, notebook computers, etc.), mobile computing devices (e.g., tablets, tablet computers, e-reader devices, etc.), mobile communication devices (e.g., smartphones, cell phones, personal digital assistants, messaging devices, pocket PCs, etc.), connectivity and charging devices (e.g., cables, hubs, docking stations, adapters, chargers, etc.), audio/video/data recording and/or playback devices (e.g., cameras, voice recorders, hand-held scanners, monitors, etc.), and other similar electronic devices that can use USB interfaces for communication, battery charging, and/or power delivery.

As used herein, "USB-enabled" device or system refers to a device or system that includes, is configured with, or is otherwise associated with a USB connector interface. A USB-enabled electronic device may comply with at least one release of a Universal Serial Bus (USB) specification. Examples of such USB specifications include, without limitation, the USB Specification Revision 2.0, the USB 3.0 Specification, the USB 3.1 Specification, the USB 3.2 Specification and/or various supplements, versions and errata thereof. The USB specifications generally define the characteristics (e.g., attributes, protocol definition, types of transactions, bus management, programming interfaces, etc.) of a differential serial bus that are required to design and build standard communication systems and peripherals. For example, a USB-enabled peripheral device attaches to a USB-enabled host device through a USB port of the host device to form a USB-enabled system. A USB 2.0 port includes a power voltage line of 5V (denoted VBUS), a differential pair of data lines (denoted D+ or DP, and D− or DN), and a ground line for power return (denoted GND). A USB 3.0 port also provides the VBUS, D+, D−, and GND lines for backward compatibility with USB 2.0. In addition, to support a faster differential bus (the USB SuperSpeed bus), a USB 3.0 port also provides a differential pair of transmitter data lines (denoted SSTX+ and SSTX−), a differential pair of receiver data lines (denoted SSRX+ and SSRX−), a power line for power (denoted DPWR), and a ground line for power return (denoted DGND). A USB 3.1 port provides the same lines as a USB 3.0 port for backward compatibility with USB 2.0 and USB 3.0 communications, but extends the performance of the SuperSpeed bus by a collection of features referred to as Enhanced SuperSpeed.

A more recent technology for USB connectors, called USB Type-C (also referred to herein as "USB-C"), is defined in various releases and/or versions of the USB Type-C specification (e.g., such as Release 1.0 dated Aug. 11, 2014, Release 1.1 dated Apr. 3, 2015, Release 1.2 dated Mar. 25, 2016, Release 1.3 dated Jul. 14, 2017, or other revisions/versions thereof). The USB Type-C specification defines Type-C receptacle, Type-C plug, and Type-C cables that can support USB communications as well as power delivery over newer USB power delivery protocols defined in various revisions/versions of the USB-PD specification. Examples of USB Type-C functions and requirements may include, without limitation, data and other communications according to USB 2.0 and USB 3.0/3.1, electro-mechanical definitions and performance requirements for Type-C cables, electro-mechanical definitions and performance requirements for Type-C receptacles, electro-mechanical definitions and performance requirements for Type-C plugs, requirements for Type-C to legacy cable assemblies and adapters, requirements for Type-C-based device detection and interface configuration, requirements for optimized power delivery for Type-C connectors, etc. According to the USB Type-C specification(s), a Type-C port provides VBUS, D+, D−, GND, SSTX+, SSTX−, SSRX+, and SSRX− lines, among others. In addition, a Type-C port also provides a Sideband Use (denoted SBU) line for signaling of sideband functionality and a Configuration Channel (denoted CC) line for discovery, configuration, and management of connections across a Type-C cable. A Type-C port may be associated with a Type-C plug and/or a Type-C receptacle. For ease of use, the Type-C plug and the Type-C receptacle are designed as a reversible pair that operates regardless of the plug-to-receptacle orientation. Thus, a standard USB Type-C connector, disposed as a standard Type-C plug or receptacle, provides pins for four VBUS lines, four ground return (GND) lines, two D+ lines (DP1 and DP2), two D− lines (DN1 and DN2), two SSTX+ lines (SSTXP1 and SSTXP2), two SSTX− lines (SSTXN1 and SSTXN2), two SSRX+ lines (SSRXP1 and SSRXP2), two SSRX− lines (SSRXN1 and SSRXN2), two CC lines (CC1 and CC2), and two SBU lines (SBU1 and SBU2), among others.

Some USB-enabled electronic devices may be compliant with a specific revision and/or version of the USB-PD specification (e.g., such as Revision 1.0 released Jul. 5, 2012, Revision 2.0 released Aug. 11, 2014, Revision 3.0 dated Mar. 25, 2016, or other revisions/versions thereof). The USB-PD specification defines a standard protocol designed to enable the maximum functionality of USB-enabled devices by providing more flexible power delivery along with data communications over a single USB Type-C cable through USB Type-C ports. The USB-PD specification also describes the architecture, protocols, power supply behavior, parameters, and cabling necessary for managing power delivery over USB Type-C cables at up to 100 W of power. According to the USB-PD specification, devices with USB Type-C ports (e.g., such as USB-enabled devices) may negotiate for more current and/or higher or lower voltages over a USB Type-C cable than are allowed in older USB specifications (e.g., such as the USB 2.0 Specification, USB 3.1 Specification, the USB Battery Charging Specification Rev. 1.1/1.2, etc). For example, the USB-PD specification defines the requirements for a power delivery contract (PD contract) that can be negotiated between a pair of USB-enabled devices. The PD contract can specify both the power level and the direction of power transfer that can be accommodated by both devices, and can be dynamically re-negotiated (e.g., without device un-plugging) upon request by either device and/or in response to various events and conditions, such as power role swap, data role swap, hard reset, failure of the power source, etc. As used herein, "USB-PD subsystem" refers to one or more logic blocks and other analog/digital hardware circuitry, which may be controllable by firmware in an IC controller and which is configured and operable to perform the functions and to satisfy the requirements specified in at least one release of the USB-PD specification.

Power delivery in accordance with the USB-PD specification(s) can be embodied in several different types of USB Type-C applications. Examples of such types of Type-C applications include, but may not be limited to: a downstream facing port (DFP) application, in which an IC controller with a USB-PD subsystem is configured to provide a downstream-facing USB port (e.g., in a USB-enabled host device); an upstream facing port (UFP) application, in which an IC controller with a USB-PD subsystem is configured to provide an upstream-facing USB port (e.g., in a USB-enabled peripheral device or adapter); a dual role port (DRP) USB application, in which an IC controller with a USB-PD subsystem is configured to support both DFP and UFP applications on the same USB port (e.g., a USB Type-C port that is configured to operate as either a power provider or a power consumer or can alternate between these two roles dynamically by using USB-PD power role swap); and an active cable application, in which an IC controller with a USB-PD subsystem is disposed into, and configured to operate, an electronically marked cable assembly (EMCA) Type-C cable.

The USB-PD specification defines, or otherwise allows, at least three different voltage supplies that can be used by, or in, an IC controller chip: VBUS (e.g., 3V-22.5V), VCONN (e.g., 3.0V-5.5V), and a local battery supply (e.g., 2.0V-5.5V). The VBUS power supply draws power from the VBUS line of a USB-C connector and is typically used for powering various USB functions. The VCONN power supply draws power from the VCONN line of the USB-C connector and is typically used for powering the USB-C chip within a cable. The local battery supply draws power from a battery and is typically used in DFP/UFP/DRP applications that can charge from a USB port.

Since the VBUS, VCONN, and local battery supplies provide different levels of power for different purposes, electronic device manufacturers need to use different types of IC controllers that are specifically designed to use a particular type of power supply depending on the particular Type-C application. For example, some implementations of USB-enabled devices may use one type of a USB-C IC controller that is powered from a local battery, while other implementations may use a different type of a USB-C IC controller that is powered from a VCONN supply. Thus, electronic device manufactures lack design flexibility for such implementations since each design requires a specific type of USB-C IC controller chip. In addition, contemporary implementations of USB-C IC controllers are not able to power from VBUS supply without external, off-chip voltage regulators that reduce the VBUS supply voltage. Thus, such contemporary implementations also suffer from higher bill-of-materials (BOM) costs if the VBUS supply is to be used to power the IC controller chip. Further, according to the USB Type-C specification, the VBUS lines are disposed adjacent to respective VCONN lines within a USB-C connector (receptacle or plug). Due to this, a USB-C IC controller is subject to short circuit risk between the VBUS and VCONN lines e.g., because of misalignment between the cable plug and the host receptacle as a result of bad manufacture, because of low wiggle tolerance after the USB-C cable is plugged, etc. Thus, the VCONN pin of the IC controller needs to withstand a temporary short to the VBUS voltage, which can be more than 20V. However, contemporary implementations of USB-C IC controllers lack on-chip over-voltage protection (OVP) on its VCONN pins, and typically use off-chip OVP circuits which leads to increased BOM costs.

To address these and other disadvantages of contemporaneous implementations, some embodiments of the power supply architecture described herein provide for coupling a VCONN supply and a VBUS supply of a USB-C IC controller to a common power rail that is coupled to a VDDD supply of the controller. As used herein, "power rail" refers to one or more conductive lines disposed on-chip that are configured to provide power to internal circuits of an IC controller. In some embodiments, a power rail of an IC controller may be configured as a power bus that may include switches, regulators, pumps, logic, and other circuits configured to selectively turn on/off power to internal circuits and to convert standard voltages to other voltages as necessary. "Logic" refers to a hardware block having one or more circuits that include various electronic components configured to process analog and/or digital signals and to perform one or more operations in response to control signal(s). Examples of such electronic components include, without limitation, transistors, diodes, resistors, capacitors, inductors, logic gates, and various circuits thereof.

According to the USB-C power supply architecture described herein, a VCONN switch with OVP circuit(s) is coupled between the common VDDD power rail and a VCONN terminal (e.g., such as a VCONN pin) of a USB-C IC controller, and a VBUS regulator is coupled between the common VDDD power rail and a VBUS terminal (e.g., such as a VBUS pin) of the IC controller. This architecture solution allows the same USB-C IC controller chip (e.g., a chip with the same or similar part number) to be used in several different Type-C applications, thereby reducing BOM cost for electronic device manufacturers. For example, in an active cable application, the USB-C IC controller chip can be powered from the VCONN supply, and it can withstand and operate under voltages greater than 20V on both VBUS and VCONN pins of the controller (e.g., when the VCONN pin is temporarily shorted to the VBUS pin through the VBUS and VCONN lines the cable). In a DFP/UFP/DRP Type-C application, the same IC controller chip can be powered by either a VBUS supply applied to the VBUS pin of the chip or by a regulated power supply (e.g., a local battery) applied to the VDDD pin of the controller chip, depending on whichever is a more convenient design choice for the electronic device manufacturer.

In one embodiment of the USB-C power supply architecture described herein, an IC controller disposed in a monolithic (e.g., single) semiconductor die is provided in a USB-enabled device. The IC controller comprises a power rail, a VDDD terminal, a VCONN terminal, and a VBUS terminal. The VDDD terminal, the VCONN terminal, and the VBUS terminal are coupled to the power rail, where a VCONN switch is coupled between the VCONN terminal and the power rail, and a VBUS regulator is coupled between the VBUS terminal and the power rail. The power rail is coupled to internal circuits of the IC controller and is configured to provide operating power to the internal circuits from any one of the VCONN terminal and the VBUS terminal. In one example aspect of this embodiment, the VCONN terminal of the IC controller is configured to withstand an input voltage of at least 20V. In another aspect, the VBUS terminal of the IC controller is configured for an input voltage between 3.0V and 24.5V. In one aspect, the VCONN switch comprises a drain-extended n-type field effect transistor (DENFET) coupled between the VCONN terminal and the power rail, and a pump switch coupled to a gate of the DENFET. The VCONN switch may further comprise: a resistor coupled between the VCONN terminal and the gate of the DENFET; a diode clamp coupled between the gate of the DENFET and ground; and/or an electro-static discharge (ESD) circuit coupled between the VCONN terminal and the gate of the DENFET. In one aspect the VBUS regulator comprises: one or more cascoded p-type field effect transistors (PFETs) coupled between the VBUS terminal and the power rail, wherein the one or more cascoded PFETs are configured to reduce a voltage from the VBUS terminal to 5V or less; and one or more DENFETs coupled between the VBUS terminal and one or more low-voltage circuits of the VBUS regulator, wherein the one or more DENFETs are configured to provide high-voltage protection to the low-voltage circuits. In this aspect, the one or more cascoded PFETs may be 5V transistors and the one or more DENFETs may be 20V transistors.

In another embodiment, a USB-enabled device, apparatus, or system comprises an IC controller and a USB Type-C connector that includes a VBUS line and a VCONN line. The IC controller comprises a VDDD terminal, a VCONN terminal coupled to the VCONN line, a VBUS terminal coupled to the VBUS line, and a power rail coupled to internal circuits of the IC controller. The VDDD terminal, the VCONN terminal, and the VBUS terminal are coupled to the power rail, where a VCONN switch is coupled between the VCONN terminal and the power rail, and a VBUS regulator is coupled between the VBUS terminal and the power rail. The power rail is configured to provide operating power to the internal circuits of the IC controller from one of the VCONN terminal and the VBUS terminal. In one aspect of this embodiment, the IC controller is configured to withstand an input voltage of at least 20V on the VCONN terminal. In another aspect, the IC controller is configured to receive an input voltage between 3.0V and 24.5V on the VBUS terminal. In various aspects, the USB-enabled device may be a USB Type-C cable, a power adapter, or a power bank.

In another example embodiment, a method of operating an IC controller in a USB-enabled device comprises: receiving input voltage on one of a VCONN terminal and a VBUS terminal of the IC controller; and providing, via a power rail, operating power to internal circuits of the IC controller from the one of the VCONN terminal and the VBUS terminal. The IC controller comprises the VCONN terminal, the VBUS terminal, the power rail, and a VDDD terminal, where the VDDD terminal, the VCONN terminal, and the VBUS terminal are coupled to the power rail, and where a VCONN switch is coupled between the VCONN terminal and the power rail, and a VBUS regulator is coupled between the VBUS terminal and the power rail. In an example aspect of this embodiment, receiving the input voltage comprises receiving a voltage of at least 20V on the VCONN terminal as a result of a short event between the VCONN terminal and the VBUS terminal. In this aspect, the method may further comprise limiting an output voltage from the VCONN switch to the power rail to no more than 6V during the short event. In one aspect, receiving the input voltage comprises receiving a voltage between 3.0V and 24.5V on the VBUS terminal. In an example aspect, receiving the input voltage comprises receiving a voltage of more than 5V on the VBUS terminal, and the method further comprises the VBUS voltage regulator reducing the voltage on the VBUS terminal down to 5V or less on the power rail. In one aspect, the method further comprises operating the VCONN switch and the VBUS regulator in a voltage range between 3.0V and 24.5V.

FIG. 1 illustrates an example semiconductor device that is configured in accordance with the USB-C power supply architecture described herein. In the embodiment illustrated in FIG. 1, device 100 is a single-chip IC controller manufactured on a semiconductor die. For example, IC controller 100 may be a single-chip IC device from the family of CCGxx USB controllers developed by Cypress Semiconductor Corporation, San Jose, Calif. In another example, IC controller 100 may be a single-chip IC that is manufactured as a System-on-Chip (SoC). In other embodiments, the IC controller 100 may be a multi-chip module encapsulated in a single semiconductor package. Among other components, IC controller 100 includes CPU subsystem 102, peripheral interconnect 114, system resources 116, input/output (I/O) subsystem 118, USB-PD subsystem 120, and various terminals (e.g., pins) that are configured for receiving and sending signals.

CPU subsystem 102 includes one or more CPUs (central processing units) 104, flash memory 106, SRAM (Static Random Access Memory) 108, and ROM (Read Only Memory) 110 that are coupled to system interconnect 112. CPU 104 is a suitable processor that can operate in an IC or a SoC device. Flash memory 106 is non-volatile memory (e.g., NAND flash, NOR flash, etc.) that is configured for storing data, programs, and/or other firmware instructions. Flash memory 106 is tightly coupled within the CPU subsystem 102 for improved access times. SRAM 108 is volatile memory that is configured for storing data and firmware instructions accessed by CPU 104. ROM 110 is read-only memory (or other suitable storage medium) that is configured for storing boot-up routines, configuration parameters, and other firmware parameters and settings. System interconnect 112 is a system bus (e.g., a single-level or multi-level Advanced High-Performance Bus, or AHB) that is configured as an interface that couples the various components of CPU subsystem 102 to each other, as well as a data and control interface between the various components of the CPU subsystem and peripheral interconnect 114.

Peripheral interconnect 114 is a peripheral bus (e.g., a single-level or multi-level AHB) that provides the primary data and control interface between CPU subsystem 102 and its peripherals and other resources, such as system resources 116, I/O subsystem 118, and USB-PD subsystem 120. The peripheral interconnect 114 may include various controller circuits (e.g., direct memory access, or DMA controllers), which may be programmed to transfer data between peripheral blocks without burdening the CPU subsystem 102. In various embodiments, each of the components of the CPU subsystem and the peripheral interconnect may be different with each choice or type of CPU, system bus, and/or peripheral bus.

System resources 116 include various electronic circuits that support the operation of IC controller 100 in its various states and modes. For example, system resources 116 may include a power subsystem having analog and/or digital circuits required for each controller state/mode such as, for example, sleep control circuits, wake-up interrupt controller (WIC), power-on-reset (POR), voltage and/or current reference (REF) circuits, etc. In some embodiments, the power subsystem may also include circuits that allow IC controller 100 to draw and/or provide power from/to external sources with several different voltage and/or current levels and to support controller operation in several power states 117 (e.g., such as active state, sleep state, and a deep sleep state with clocks turned off). Further, in some embodiments the CPU subsystem 102 may be optimized for low-power operation with extensive clock gating and may include various internal controller circuits that allow the CPU to operate in the various power states 117. For example, the CPU may include a wake-up interrupt controller that is configured to wake the CPU from a sleep state, thereby allowing power to be switched off when the IC chip is in the sleep state. System resources 116 may also include a clock subsystem having analog and/or digital circuits for clock generation and clock management such as, for example, clock control circuits, watchdog timer (WDT) circuit(s), internal low-speed oscillator (ILO) circuit(s), and internal main oscillator (IMO) circuit(s), etc. System resources 116 may also include analog and/or digital circuit blocks that provide reset control and support external reset (XRES).

In various embodiments, I/O subsystem 118 may include various different types of I/O blocks and subsystems. For example, in the embodiment illustrated in FIG. 1, I/O subsystem 118 includes GPIO (general purpose input output) blocks 118a, TCPWM (timer/counter/pulse-width-modulation) blocks 118b, and SCBs (serial communication blocks) 118c. GPIOs 118a include analog and/or digital circuits configured to implement various functions such as, for example, pull-ups, pull-downs, input threshold select, input and output buffer enabling/disabling, multiplex signals connected to various I/O pins, etc. TCPWMs 118b include analog and/or digital circuits configured to implement timers, counters, pulse-width modulators, decoders and various other analog/mixed signal elements that are configured to operate on input/output signals. SCBs 118c include analog and/or digital circuits configured to implement various serial communication interfaces such as, for example, I$^2$C, SPI (serial peripheral interface), UART (universal asynchronous receiver/transmitter), CAN (Controller Area Network) interface, CXPI (Clock eXtension Peripheral Interface), etc.

USB-PD subsystem 120 provides the interface to a USB Type-C port and is configured to support USB communications as well other USB functionality, such as power delivery and battery charging. USB-PD subsystem 120 includes the electro-static discharge (ESD) protection circuits required on a Type-C port. USB-PD subsystem 120 also includes a Type-C transceiver and physical layer logic (PHY), which are configured as an integrated baseband PHY circuit to perform various digital encoding/decoding functions (e.g., Biphase Mark Code-BMC encoding/decoding, cyclical redundancy checks-CRC, etc.) and analog signal processing functions involved in physical layer transmissions. USB-PD subsystem 120 also provides the termination resistors (RP and RD) and their switches, as required by the USB-PD specification, to implement connection detection, plug orientation detection, and power delivery roles over a Type-C cable. IC controller 100 (and/or the USB-PD subsystem 120 thereof) may also be configured to respond to communications defined in a USB-PD Specification such as, for example, SOP (start-of-packet), SOP', and SOP" messaging.

Among other circuitry, USB-PD subsystem 120 may further include: one or more analog-to-digital convertors (ADCs) for converting various analog signals to digital signals; an error amplifier (ERROR AMP) for controlling the power source voltage applied to the VBUS line per a PD contract; a high voltage regulator (HV REG) for converting the power supply voltage to the precise voltage (e.g., 3-5V) needed to power IC controller 100; a current sense amplifier (CSA) and an over-voltage protection (OVP) circuits for providing over-current and over-voltage protection on the VBUS line with configurable thresholds and response times; one or more gate drivers (GATE DRV) for controlling the power switches that turn on and off the provision of power over the VBUS line; a communication channel PHY (CC BB PHY) logic for supporting communications on a Type-C Communication Channel (CC) line; and at least two on-die discharge (VBUS DISCH) circuits that can discharge a VBUS line voltage to any of range of programmable voltage levels.

In accordance with the USB-C power supply architecture described herein, USB-PD subsystem 120 includes a VCONN switch (VCONN SW) and a VBUS regulator (VBUS REG). The VCONN switch is coupled between a VCONN pin of IC controller 100 and a common power rail. The VBUS regulator is coupled between a VBUS pin of IC controller 100 and the common power rail. The common power rail is coupled to a VDDD pin of IC controller 100 and is configured to provide power to internal circuits of the controller. For example, the common (e.g., VDDD) power rail may be configured to provide power from any one of the VCONN, VBUS, or VDDD pins to some (or all) of the analog and/or digital circuits in system resources 116, I/O subsystem 118, and USB-PD subsystem 120 that operate in the range of 2.0V to 5.5V.

Figure 2:
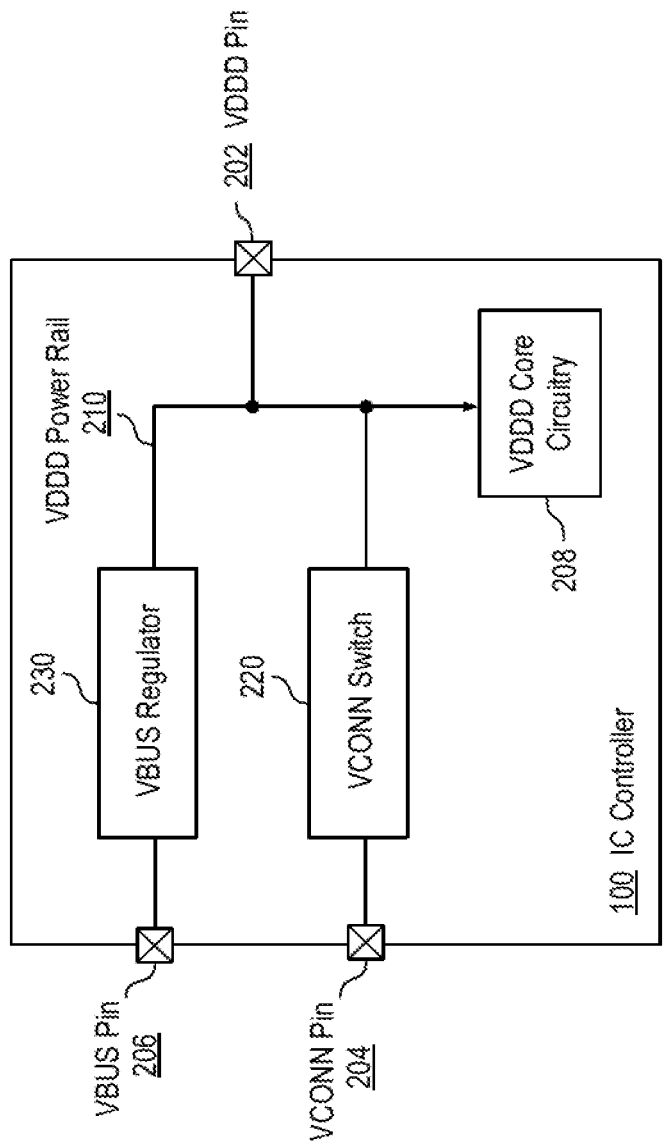
FIG. 2 illustrates a schematic diagram of an example power supply architecture for a USB IC controller, according to some embodiments.

FIG. 2 illustrates a schematic diagram of an IC controller (e.g., such as IC controller 100 in FIG. 1) in accordance with the USB-C power supply architecture described herein. IC controller 100 includes VDDD pin 202, VCONN pin 204 and VBUS pin 206, which all are coupled (directly or indirectly) to common power rail 210 and are configured to receive input voltage signals for powering the IC controller. In this manner, IC controller 100 can be powered from three separate possible power supplies—VCONN, VBUS, or VDDD, depending on the design needs of electronic device manufacturers. The configuration of IC controller 100 determines which one of the VCONN, VBUS, or VDDD supplies would power the chip—e.g., by means of a bit or bits in configuration firmware that controls operation of the controller and its circuits. For example, in some USB-PD applications IC controller 100 can be powered from the VBUS or VCONN pin, with the VDDD pin left floating. In other USB-PD applications, the IC controller 100 can be powered from the VDDD pin, with the VBUS and VCONN pins left floating or grounded.

VCONN switch 220 is coupled between VCONN pin 204 and the common power rail 210, and is controlled by hardware digital blocks and logic. VCONN switch 220 is configured to convert the input voltage (e.g., in the range 3.0V-5.5V) on VCONN pin 204 to a voltage within the VDDD voltage range (e.g., 2.0V-5.5V) that is required on power rail 210. VCONN switch 220 is also configured to provide OVP protection and International Electrochemical Commission (IEC) ESD protection for any circuits that are powered from power rail 210. The OVP and IEC-ESD circuits in VCONN switch 220 limit the voltage that the output provides on power rail 210 and protects against excessive voltage on the VCONN supply line due to transmission effects (e.g., such as ringing). In this manner, VCONN pin 204 can withstand and operate at voltages above 20V, while also being able to provide power to the internal circuits of IC controller 100.

VBUS regulator 230 is coupled between VBUS pin 206 and the common power rail 210, and is controlled by hardware digital blocks and logic. VBUS regulator 230 is configured to convert the input voltage (e.g., in the range 3.0V-24.5V) on VBUS pin 206 to a voltage within the VDDD voltage range (e.g., 2.0V-5.5V) that is required on power rail 210. VBUS regulator 230 is also configured to provide OVP protection for any circuits that are powered from power rail 210. In this manner, IC controller 100 is configured to be powered from its VBUS pin 206 for all PD contracts allowable on a VBUS line, e.g., from 3V up to at least 20V as specified in the USB-PD specification.

Common power rail 210 is coupled to provide power to VDDD core circuitry 208. VDDD core circuitry 208 may include some (or all) internal circuits of IC controller 100. For example, core circuitry 208 may include various low-voltage analog circuits that require input voltage in the range of 2.0V-5.5V. Core circuitry 208 may also include various low-voltage digital circuits that require input voltage of up to 1.8V. Such analog and/or digital circuits may be included in various subsystems of IC controller 100 (e.g., such as circuits in the power and clock subsystems in systems resources 116, circuits in I/O subsystem 118, and circuits in USB-PD subsystem 120 that were described with respect to FIG. 1 above), including any voltage regulators and other circuits that operate to lower the voltage on power rail 210 to voltage that is required to power digital logic of the controller.

The USB-C power supply architecture illustrated in FIG. 2 allows IC controller 100 to be powered from one of three power supplies related to the USB-PD specification: VBUS, VCONN, or VDDD. The VBUS supply is the main power supply from a USB power provider and can range from 3V to 24.5V in normal operation (and up to ~30V for absolute max). It can be used in DFP/UFP/DRP Type-C applications to power the internal circuits of the IC controller without the use of an external, off-chip voltage regulator. The VCONN supply is the voltage supply provided through the USB-C connector of an EMCA cable/dongle, and can be used by the cable/dongle as the power source for the internal circuits of the IC controller. The voltage range of the VCONN supply is also from 3V to 24.5V, because it can temporarily be shorted to the VBUS supply under certain events. The VCONN supply also can be used in an EMCA cable to power the internal circuits of the IC controller without the use of an external, off-chip voltage regulator. The VDDD supply can be a power supply derived from an electronic device's local battery. Its voltage range is typically from 2.0V to 5.5V and can be used to power the internal circuits of the IC controller in any Type-C applications with a local battery per the design choices of the electronic device manufacturers.

Figure 3:
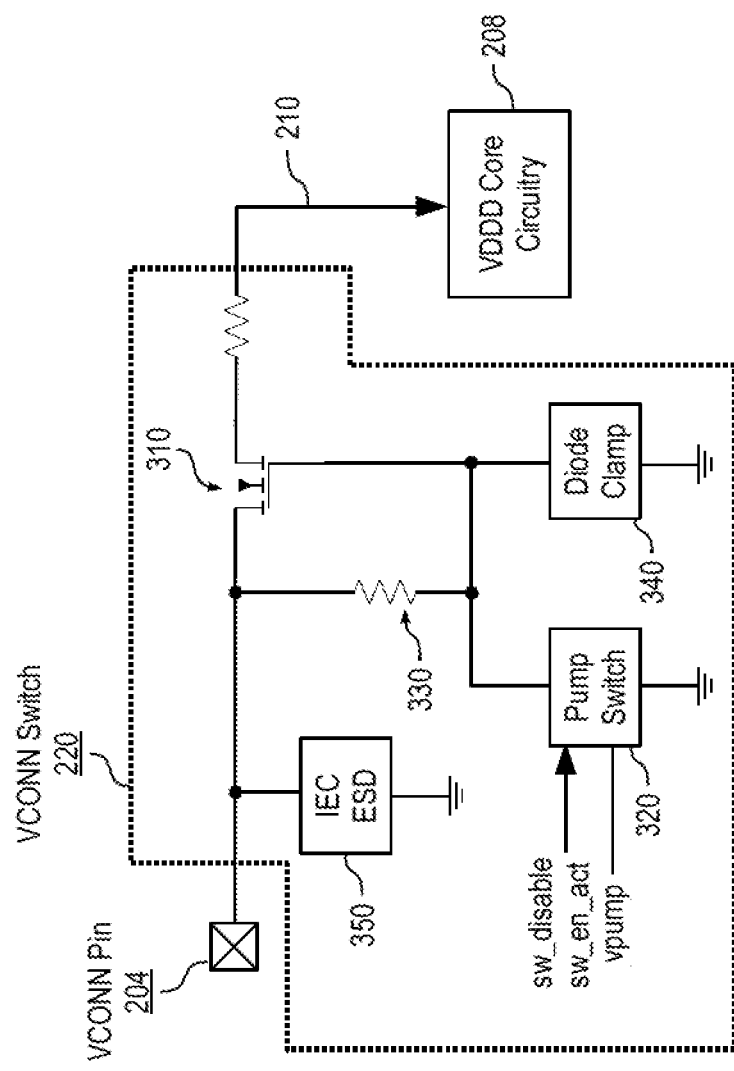
FIG. 3 illustrates a schematic diagram of an example VCONN switch architecture for a USB IC controller, according to some embodiments.

FIG. 3 illustrates a schematic diagram of an example VCONN switch (e.g., such as VCONN switch 220 in FIG. 2) in accordance with the USB-C power supply architecture described herein. As illustrated in FIG. 3, VCONN switch 220 is coupled between VCONN pin 204 and common power rail 210. Power rail 210 is coupled to provide power to the circuits in core circuitry 208.

VCONN switch 220 includes DENFET 310, pump switch 320, pull-up resistor 330, diode clamp 340, on-chip ESD circuit 350, and may also include a charge pump and control logic (not shown). DENFET 310 is a 20V transistor, which means that it can withstand a voltage of at least 20V between its drain and its gate. Its extended drain is coupled to VCONN pin 204 and its source is coupled to power rail 210 (e.g., through a suitable resistor). The gate of DENFET 310 is coupled (through pull-up resistor 330) to VCONN pin 204, to the output of pump switch 320, and to the input of diode clamp 340. Pump swich 320 is configured to receive a voltage signal ("vpump") from a charge pump (not shown), and to apply the voltage signal to the gate of DENFET 310. The operation of pump switch 320 is controlled by two control signals ("sw_disable" and "sw_en_act"), which determine the three operational states of pump switch 320 (power-up, active and disabled). Pull-up resistor 330 is coupled between VCONN pin 204 and the gate of DENFET 310, and has a resistance (e.g., 1MΩ) that is suitable to pull-up the DENFET gate when voltage is applied on VCONN pin 204. Diode clamp 340 is coupled between the gate of DENFET 310 and ground, and is configured to clamp the voltage applied on the DENFET gate, in the event where VCONN shorts to VBUS. ESD circuit 350 is coupled to VCONN pin 204 and uses a Gate Induced Drain Leakage (GIDL)-based architecture to implement ESD protection to prevent an over-current surge on the VCONN pin 204.

In operation, DENFET 310 acts as a power switch between VCONN pin 204 and common power rail 210. During normal operation, the gate of DENFET 310 is either weakly pulled up to the voltage on VCONN pin 204 through the resistor 330, or it is pulled up to a ~5V pump voltage signal ("vpump") that is applied to the DENFET gate through pump switch 320. The pump voltage is such that it can fully turn on DENFET 310, which has at least two benefits. First, the "on" resistance of DENFET 310 is minimized when current is supplied from VCONN pin 204 to power rail 210. Second, the pump voltage limits the voltage provided to power rail 210 when the VCONN input is shorted to the VBUS voltage (e.g., 20V). Since DENFET 310 cannot pass through a voltage higher than Vgs=Vg−Vt (where Vg is the DENFET gate voltage, Vgs is the gate to source voltage difference, and Vt is the DENFET threshold voltage), applying the pump voltage to the gate of the DENFET effectively limits the voltage provided to power rail 210 to less than 5V.

In addition, during a short event between the input voltage on VCONN pin 204 and the VBUS voltage (e.g., up to 24.5V, or even ~30V max), diode clamp 340 limits the voltage on the gate of DENFET 310 to no more than 6V. This protects the DENFET gate and limits the output voltage provided on power rail 210 to less than 6V. There is no voltage detection circuitry necessary, and these circuits of VCONN switch 220 can operate indefinitely in the 3.0V to 24.5V range. Further, during a VBUS short event, ESD circuit 350 acts as another clamp on VCONN pin 204 and thus any ringing on the VCONN pin is limited to no more than ~30V since the circuit starts clamping around that voltage. ("Ringing" here refers to the oscillation of the VCONN input signal in the response to a sudden change in input, e.g., the short event.) If no ESD protection is provided for VCONN switch 220, such ringing can cause a voltage increase of up to 2× (e.g., up to ~40V if a PD contract requires VBUS to provide the maximum 20V specified in the USB-PD specification).

Figure 4:
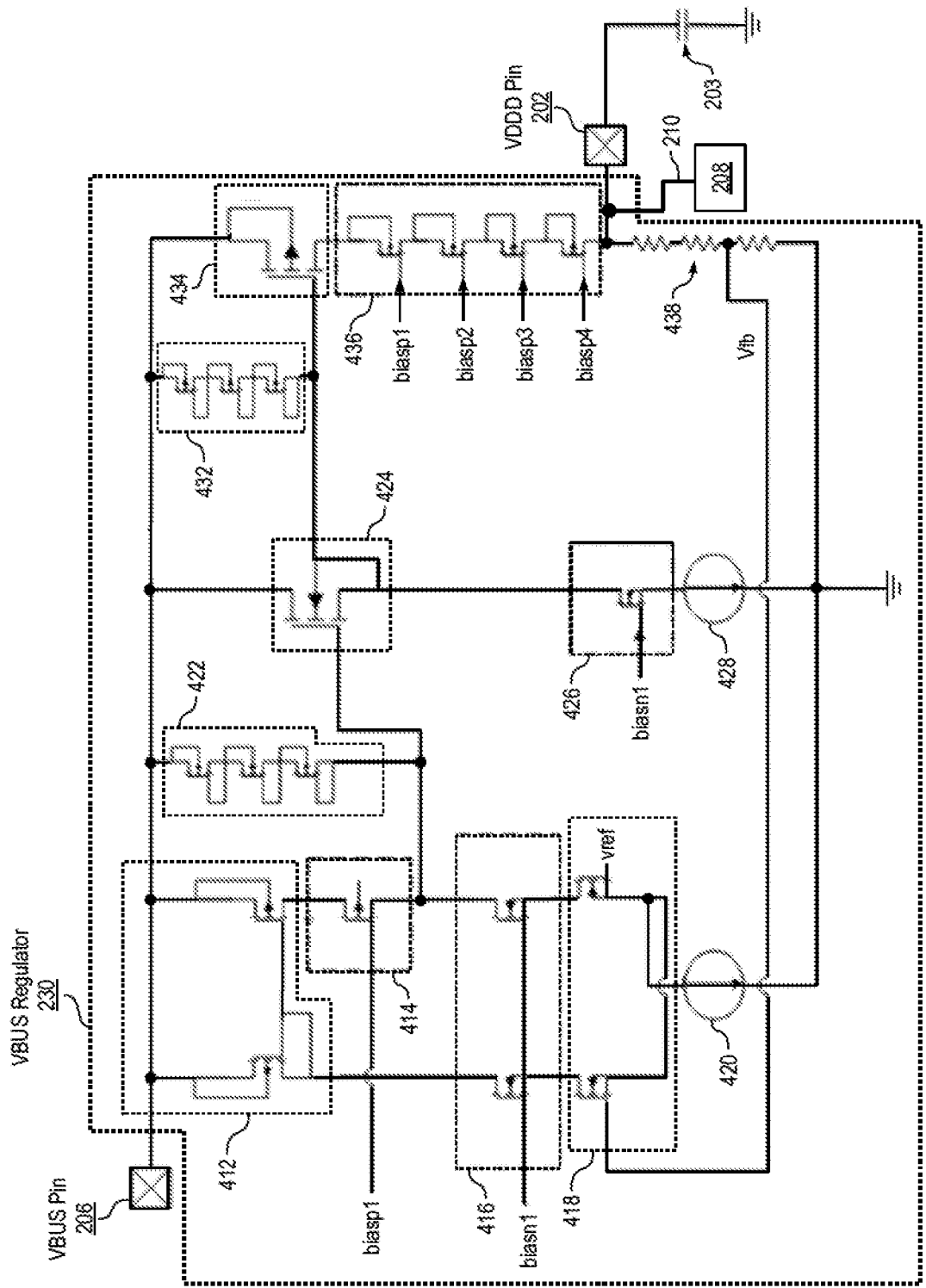
FIG. 4 illustrates a schematic diagram of an example VBUS regulator architecture for a USB IC controller, according to some embodiments.

FIG. 4 illustrates a schematic diagram of an example VBUS regulator (e.g., such as VBUS regulator 230 in FIG. 2) in accordance with the USB-C power supply architecture described herein. As illustrated in FIG. 4, VBUS regulator 230 is coupled between VBUS pin 206 and common power rail 210. Power rail 210 is coupled to VDDD pin 202, and also to the circuits in core circuitry 208 to provide power thereto. When IC controller 100 is configured to be powered from VBUS pin 206, VDDD pin 202 should be left floating and may be coupled through an off-chip capacitor 203 to ground. Off-chip capacitor 203 should have a suitable capacitance (e.g., 1 μF) to provide stability and to improve the transient response on VDDD pin 202. VBUS regulator 230 includes a differential error amplifier, a voltage buffer, and an output block that are coupled in a feedback loop and are configured to provide a fixed voltage to power rail 210.

Diode-connected transistors 412, PFET 414, protection DENFETs 416, amplifier 418, and current source 420 are configured to operate as the differential error amplifier of VBUS regulator 230. Diode-connected transistors 412 are PFETs coupled to VBUS pin 206 and are configured to mirror the VBUS voltage on both sides of the differential error amplifier. PFET 414 is coupled between the output of one of transistors 412 and protection DENFETs 416, and its gate is coupled to receive a bias voltage control signal ("biasp1"). The output of PFET 414 is coupled as an input signal to the gate of source follower 424. Protection DENFETs 416 are configured to provide high-voltage protection to the low-voltage circuits in amplifier 418 and current source 420. The gates of DENFETs 416 are coupled to receive a bias voltage control signal ("biasn1"). The input (left) side of amplifier 418 is coupled to receive a feedback voltage ("Vfb") signal from resistor divider 438. The reference (right) side of amplifier 418 is coupled to receive a reference voltage ("vref"), which is compared to the feedback voltage ("Vfb") received from resistor divider 438. The output of amplifier 418 is coupled to current source 420. Current source 420 is a constant current source and is coupled to provide constant current through the differential error amplifier.

Cascoded transistors 422, source follower 424, DENFET 426, and current source 428 are configured to operate as a voltage buffer to transfer the output signal from the differential error amplifier to the output block of VBUS regulator 230. Cascoded transistors 422 are PFETs coupled in series between VBUS pin 206 and the gate of source follower 424, and are configured to provide protection against transient voltage fluctuations of the VBUS voltage. Source follower 424 is a N-Type Field Effect Transistor (NFET), and its gate is coupled to receive input voltage from PFET 414. The output of source follower 424 is coupled to DENFET 426 and to the gate of pass transistor 434. The gate of DENFET 426 is coupled to receive a bias voltage control signal ("biasn1"). DENFET 426 is configured to provide high-voltage protection to the low-voltage circuits in current source 428. Current source 428 is a constant current source, which is coupled to the source of DENFET 426 and is configured to provide constant current through the voltage buffer of VBUS regulator 230.

Cascoded transistors 432, pass transistor 434, PFETs 436, and resistor divider 438 are configured to operate as the output block of VBUS regulator 230. Cascoded transistors 432 are PFETs coupled in series between VBUS pin 206 and the gate of pass transistor 434, and are configured to provide protection against transient voltage fluctuations of the VBUS voltage. Pass transistor 434 is a PFET, and its gate is coupled to the output of source follower 424. The source of pass transistor 434 is coupled to VBUS pin 206, and the drain of the pass transistor is coupled as input to PFETs 436. PFETs 436 are cascoded PMOS devices coupled in series. PFETs 436 are configured to reduce the voltage received from VBUS pin 206 to the lower, fixed voltage that is required by power rail 210 (e.g., down to less than 5V), thereby also providing high-voltage protection to the output block of VBUS regulator 230. Each of the gates of PFETs 436 is coupled to receive a respective bias voltage control signal ("biasp1", "biasp2", "biasp3", "biasp4", etc.). The output of PFETs 436 is coupled to power rail 210 and to resistor divider 438. The resistors in resistor divider 438 are selected to provide a fixed-ratio offset from the voltage on power rail 210.

In the embodiment illustrated in FIG. 4, the bias voltage control signals (e.g., ("biasp1", "biasp2", "biasp3", "biasp4") provided to the PFET transistors (e.g., PFET 414 and PFETs 436) are generated from 20V bias generation circuits (not shown) that are powered by the VBUS voltage. The voltage of each bias voltage control signal is generated based on the VBUS voltage, so these bias voltages dynamically change as the VBUS voltage changes (e.g., in response to a re-negotiated PD contract). VBUS regulator 230 also includes a crude voltage regulator block (not shown in FIG. 4) that is configured to generate various bias voltages in the range of 2.0V-5.5V from the VBUS voltage on VBUS pin 206. The output from the crude voltage regulator block is used as the supply for various logic blocks and to generate the bias voltage control signals (e.g., such as "biasn1") that are provided to the protection DENFETs 416 and 426. The transistors in protection DENFETs 416 and 426 are 20V drain extended NMOS devices, and the majority of the other transistor devices in VBUS regulator 230 (e.g., transistors 412, 418, 422, 424, 432, 434, and 436) are 5V-compatible, which means that they can tolerate approximately 5V across any of its terminals.

The voltage required on power rail 210 is fixed by the design of the IC controller. The resistors in resistor divider 438 are selected to provide a fixed-ratio offset from the voltage on power rail 210. This fixed-ratio voltage across resistor divider 438 is the feedback voltage ("Vfb") that is input to amplifier 418 and is compared to the reference voltage ("vref") of the amplifier. In the steady operational state of VBUS regulator 230, the reference voltage ("vref") and the feedback voltage ("Vfb") across resistor divider 438 are equal, so amplifier 418 is balanced and the currents flowing through its input (left) and reference (right) sides are also equal. In an example embodiment, the design-fixed voltage on power rail 210 is set at 3.3V, and in the steady operational state the feedback voltage ("Vfb") and the reference voltage ("vref") are both equal to 0.74V.

When the voltage on power rail 210 is momentary pulled down (e.g., when an internal circuit in core circuitry 208 is turned on), the feedback voltage ("Vfb") across resistor divider 438 goes lower than the steady-state reference voltage ("vref"). As a result, the voltage on the gate of the input (left) side of amplifier 418 goes lower and it conducts less current than in the steady-state. To compensate, current source 420 pulls more current through the reference (right) side of amplifier 418. This causes more current to be pulled from the gate of source follower 424 (since, under the control of its bias control signal "biasp1", PFET 414 always conducts a fixed amount of current). Drawing more current from the gate of source follower 424 causes its gate voltage to go lower than in the steady-state, which in turn causes source follower 424 to conduct less current. To compensate, current source 428 draws more current from the gate of pass transistor 434 than in the steady-state. Drawing more current from the gate of pass transistor 434 causes its gate voltage to go lower than in the steady-state, which in turn causes the pass transistor to conduct more current than in the steady-state (since pass transistor 434 is a PFET). Thus, more current is provided to the input of PFETs 436, and as a result the voltage output by PFETs 436 to power rail 210 is pulled up. The VBUS regulator 230 operates like this for a short time until the voltage on power rail 210 is pulled up to its required voltage. In this manner, VBUS regulator 230 pulls up the voltage level on power rail 210 after it has momentarily gone down.

When the voltage on power rail 210 is momentary pulled up (e.g., when an internal circuit in core circuitry 208 is turned off), the feedback voltage ("Vfb") across resistor divider 438 goes higher than the steady-state reference voltage ("vref"). As a result, the voltage on the gate of the input (left) side of amplifier 418 goes higher and it conducts more current than in the steady-state. To compensate, current source 420 pulls less current through the reference (right) side of amplifier 418. This causes less current to be pulled from the gate of source follower 424 (since, under the control of its bias control signal "biasp1", PFET 414 always conducts a fixed amount of current). Drawing less current from the gate of source follower 424 causes its gate voltage to go higher than in the steady-state, which in turn causes source follower 424 to conduct more current. To compensate, current source 428 draws less current from the gate of pass transistor 434 than in the steady-state. Drawing less current from the gate of pass transistor 434 causes its gate voltage to go higher than in the steady-state, which in turn causes the pass transistor to conduct less current than in the steady-state (since pass transistor 434 is a PFET). Thus, less current is provided to the input of PFETs 436, and as a result the voltage output by PFETs 436 to power rail 210 is pulled down. The VBUS regulator 230 operates like this for a short time until the voltage on power rail 210 is pulled down to its required voltage. In this manner, VBUS regulator 230 pulls down the voltage level on power rail 210 after it has momentarily gone up.

Figure 5A:
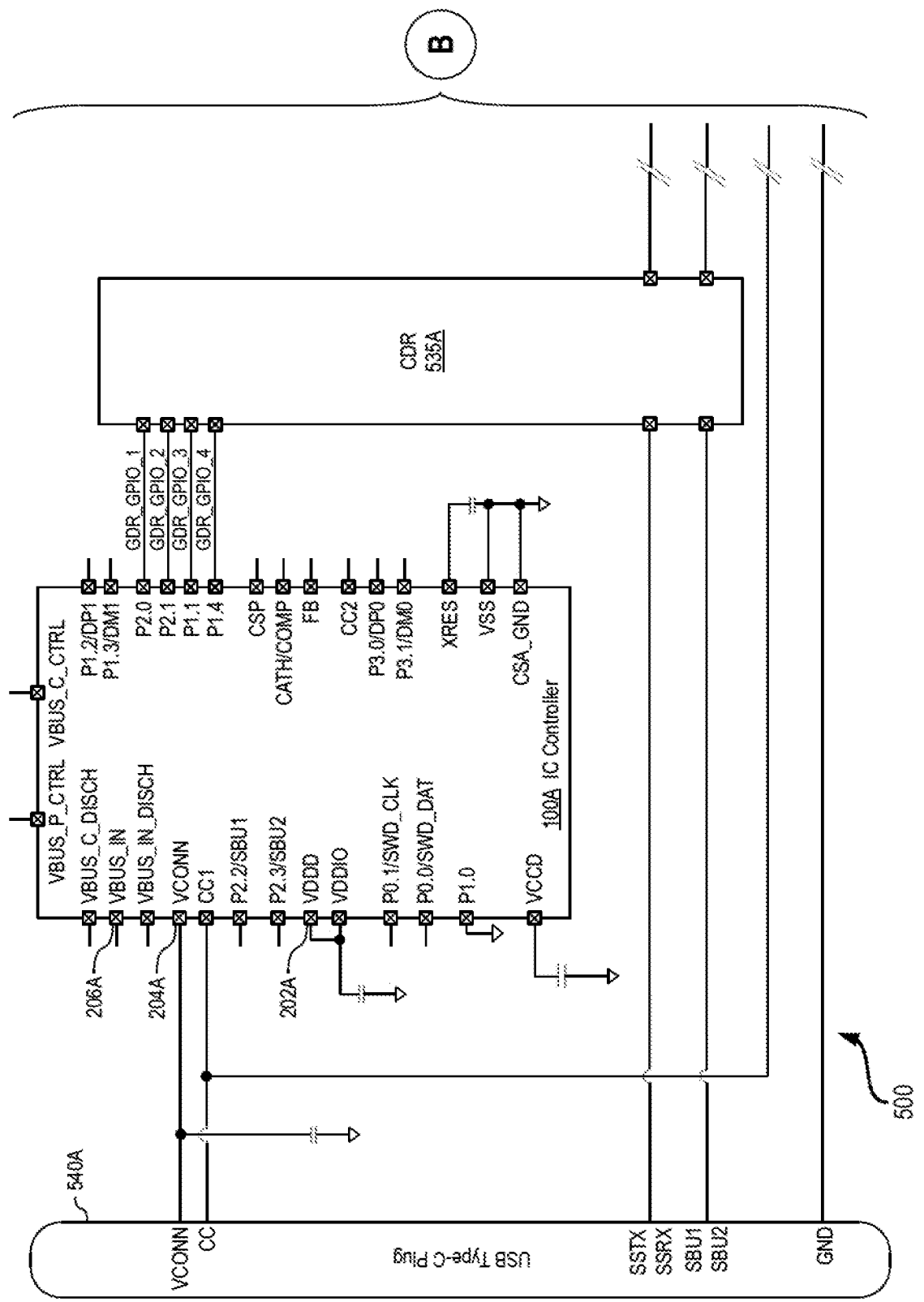
FIGS. 5A and 5B collectively illustrate a schematic diagram of a USB Type-C cable assembly according to an example embodiment, where
Figure 5B:
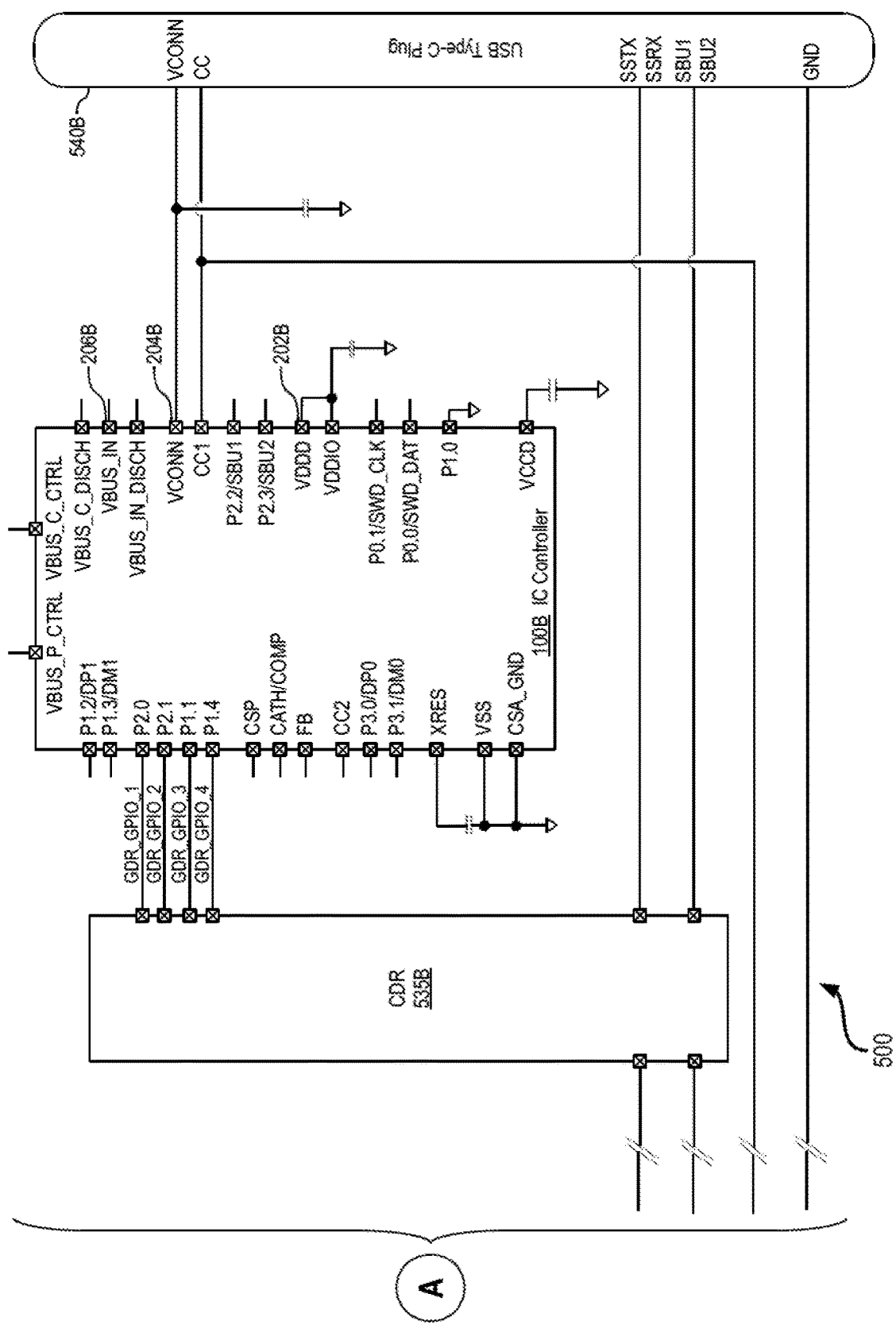
Figure 6:
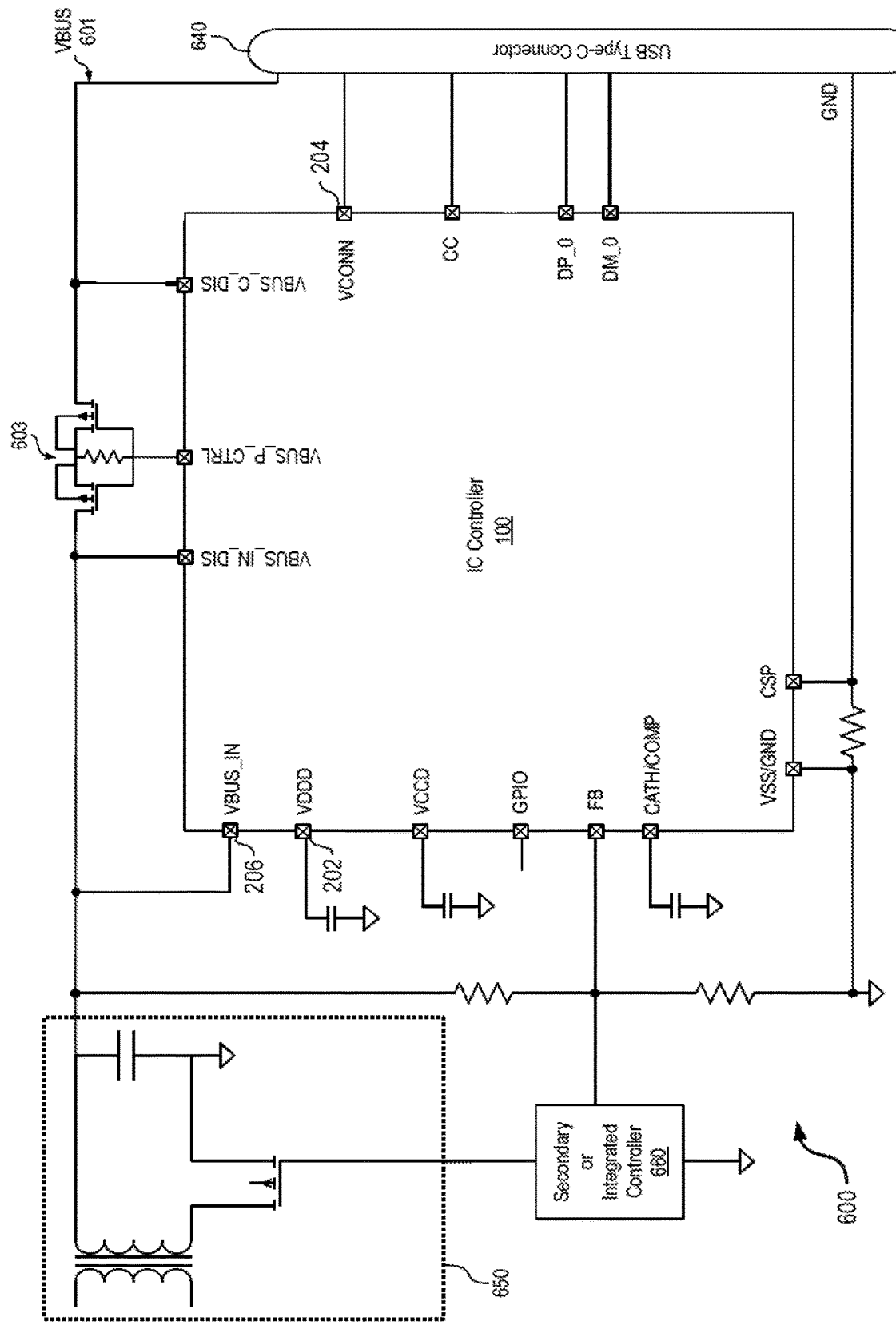
FIG. 6 illustrates a schematic diagram of a USB-PD power adapter, according to an example embodiment.

According to the USB-C power supply architecture described herein, the same IC chip product may be disposed in an active Type-C cable application as a cable controller powered from its VCONN pin (e.g., as illustrated in FIGS. 5A and 5B) and in a DFP/UFP/DRP application as a USB-C controller powered from its VBUS pin (e.g., as illustrated in FIG. 6) or from a regulated local power supply (e.g., such as battery). This allows the same IC chip product to be used for multiple USB Type-C and USB-PD applications such as active cables, power adapters, power banks, etc., thereby reducing the BOM costs and providing more design flexibilities to electronic device manufacturers.

FIGS. 5A and 5B collectively illustrate a schematic diagram of an EMCA cable assembly that embodies the USB-C power supply architecture described herein. Specifically, FIG. 5A illustrates one end of a USB Type-C cable 500 and FIG. 5B illustrates the other end of the same cable. Two IC controllers 100A and 100B, both powered from the VCONN line of cable 500, are disposed as cable controllers at the respective ends of the cable. In the embodiment of FIGS. 5A and 5B, cable 500 is configured to transfer multiple different types of communications over its lines. For example, cable 500 supports a tunneling protocol that provides multiple types of communications—e.g., PCI-Express (PCI-E), Display Port (DP), and USB 3.0+ (e.g., 10 GB+)—over its SSTX and SSRX lines. In use, one end of cable 500 may be plugged into a host device (e.g., a laptop, a notebook, a desktop computer, etc.), and the other end may be plugged into a peripheral device (e.g., a docking station, a monitor, etc.) The host device bundles the different types of communications and tunnels them over the lines of cable 500 to the peripheral device, and the peripheral device un-bundles them back upon receipt at the other end.

As illustrated in FIG. 5A, USB-C plug 540A, IC controller 100A, and clock and data recovery (CDR) chip 535A are disposed within one end of USB-C cable 500. As illustrated in FIG. 5B, USB-C plug 540B, IC controller 100B, and CDR chip 535B are disposed within the other end of cable 500. Cable 500 includes SSTX lines, SSRX lines, SBU1 and SBU2 lines, and a ground GND line (among others) that are routed from plug 540A at one end of the cable to plug 540B at the other end of the cable. The ground GND line runs across from plug 540A to plug 540B. The SSTX lines, the SSRX lines, and the SBU1 and SBU2 lines are routed from plug 540A to plug 540B via CDR chips 535A and 535B. Each of CDR chips 535A and 535B includes various components (e.g., such as repeaters, bridges, etc.) that are configured to re-time and re-condition the signals on the SSTX, SSRX, and SBU lines.

Referring to FIG. 5A, the VDDD pin 202A of IC controller 100A is coupled to ground through a suitable capacitor (e.g., 1 µF), which provides stability and improves the transient response on the VDDD pin. The VBUS_IN pin 206A is left floating. Four input/output pins of IC controller 100A ("GD_GPIO1", "GDR_GPIO2", "GDR_GPIO3", "GDR_GPIO4") are coupled to respective pins of CDR chip 535A for data, control, and power thereto. The VCONN line of plug 540A is connected to VCONN pin 204A of IC controller 100A. In accordance with the USB-C power supply architecture described herein, VCONN pin 204A is coupled through a VCONN switch to the VDDD power rail of IC controller 100A. In operation, IC controller 100A is configured to receive input voltage on VCONN pin 204A and to provide operating power, via the VDDD power rail, to the internal circuits of the IC controller.

Referring to FIG. 5B, the VDDD pin 202B of IC controller 100B is coupled to ground through a suitable capacitor (e.g., 1 µF), which provides stability and improves the transient response on the VDDD pin. The VBUS_IN pin 206B is left floating. Four input/output pins of IC controller 100B ("GDR_GPIO1", "GDR_GPIO2", "GDR_GPIO3", "GDR_GPIO4") are coupled to respective pins of CDR chip 535B for data, control, and power thereto. The VCONN line of plug 540B is connected to VCONN pin 204B of IC controller 100B. In accordance with the USB-C power supply architecture described herein, VCONN pin 204B is coupled through a VCONN switch to the VDDD power rail of IC controller 100B. In operation, IC controller 100B is configured to receive input voltage on VCONN pin 204B and to provide operating power, via the VDDD power rail, to the internal circuits of the IC controller.

FIG. 6 illustrates a schematic diagram of a USB-PD power adapter 600 as a DFP/UFP/DRP Type-C application that embodies the USB-C power supply architecture described herein. According to the USB-PD specification, a power adapter can be configured to deliver power (e.g., up to 5 A of current at up to 20V, for a total of up to 100 W) to another device through a power path configured on a USB-C VBUS line. The device that provides power over a USB-C VBUS line is typically referred to as (or includes) a "power provider", and the device that consumes the provided power is typically referred to as (or includes) a "power consumer".

In FIG. 6, USB-PD power adapter 600 includes IC controller 100, USB Type-C connector 640, power converter 650, and secondary controller 660. IC controller 100 includes a USB-PD subsystem as described heretofore and is configured to negotiate a PD contract with a power consumer (not shown) attached to USB Type-C connector 640. In various embodiments, USB Type-C connector 640 may be a Type-C plug or a Type-C receptacle. Power converter 650 is an AC power source and includes a large bulk capacitor configured to remove the AC component of the power signal provided onto VBUS line 601. Power converter 650 is coupled to secondary controller 660, which is configured to control the voltage provided by the power converter based on a feedback signal from an output pin ("FB") of IC controller 100. IC controller 100 supports two modes of operation, constant voltage mode and constant current mode (also referred to as direct charging mode). Upon appropriate negotiation with a power consumer device through the CC1 line of USB Type-C connector 640, IC controller 100 switches between its two modes of operation and provides the appropriate feedback signal on its output pin "FB" to control the operation of secondary controller 660.

Power adapter 600 includes a power switch 603 on its VBUS line 601. Power switch 603 is configured as an on/off switch device controlled by signals from an output pin ("VBUS_P_CTRL") of a gate driver in IC controller 100. In operation, the direction of power flow on VBUS line 601 is from power converter 650 to a power consumer (e.g., such as a mobile phone, not shown) that is attached to USB Type-C connector 640. When a PD contract with the power consumer is negotiated, IC controller 100 turns on power switch 603 to provide power to the consumer device at the negotiated voltage and/or current level(s).

In accordance with the USB-C power supply architecture described herein, IC controller 100 is powered from the VBUS line 601 of power adapter 600. VDDD pin 202 of IC controller 100 is coupled to ground through a suitable capacitor (e.g., 1 µF), which provides stability and improves the transient response on the VDDD pin. The VCONN pin 204 is connected to a corresponding pin in USB Type-C connector 640. The VBUS line 601 of power adapter 600 is connected to VBUS_IN pin 206 of IC controller 100. In accordance with the USB-C power supply architecture described herein, VBUS_IN pin 206 is coupled through a VBUS regulator to the VDDD power rail of IC controller 100. In operation, IC controller 100 is configured to receive input voltage on VBUS_IN pin 206 and to provide operating power, via the VDDD power rail, to the internal circuits of the IC controller.

The USB-C power supply architecture described herein allows one IC chip product to be embodied in multiple different USB Type-C and USB-PD applications (e.g., such as EMCA cables, power adaptors, power banks, etc.) that have different power supply requirements. The IC chip product can be powered from three possible power supplies: VBUS, VCONN, and VDDD. The VCONN pin of the chip can operate at voltages above 20V and has IEC ESD protection that limits the voltage on the VCONN supply line due to transmission line effects (e.g., such as ringing). The chip also supports powering of its internal circuits from its VBUS pin for all PD contracts allowed under the USB-PD specification, e.g., from 3V up to 20V. Such power supply architecture also provides BOM cost reduction since all of the features can be integrated into a single IC controller to support all of the three power supplies.

Figure 7:
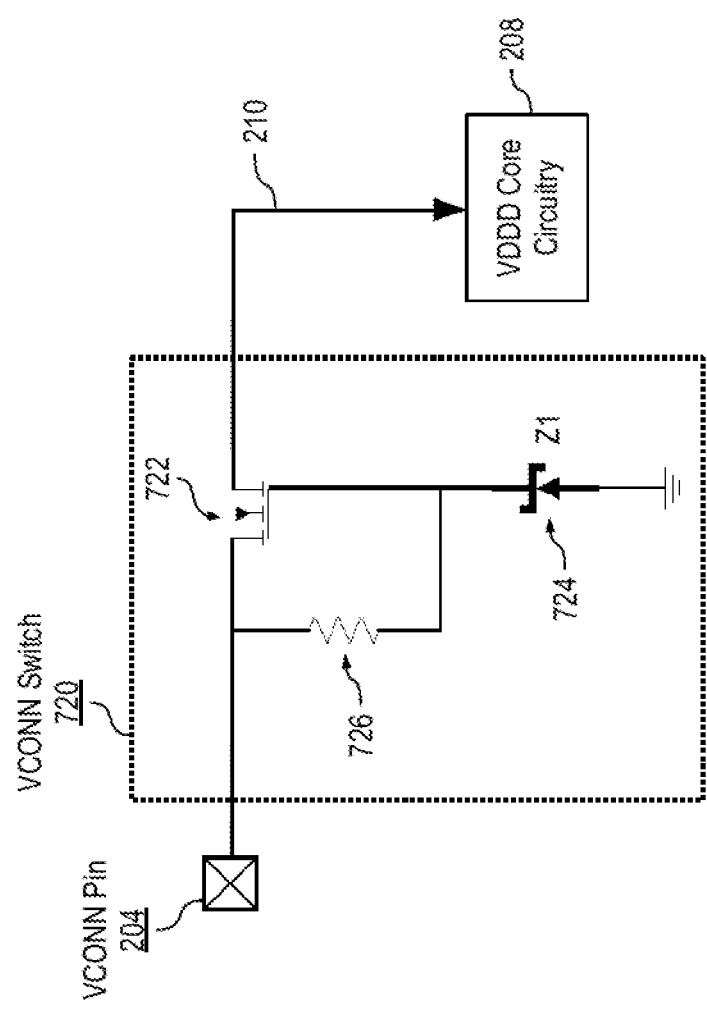
FIG. 7 illustrates a schematic diagram of a VCONN switch architecture, according to an example embodiment.

FIG. 7 illustrates a schematic diagram of a VCONN switch according to an alternative embodiment of the USB-C power supply architecture described herein. VCONN switch 720 is coupled between VCONN pin 204 and common power rail 210. Power rail 210 is coupled to provide power to the circuits in core circuitry 208.

VCONN switch 720 includes NFET 722, Zener diode 724, and pull-up resistor 726. The drain of NFET 722 is coupled to VCONN pin 204 and its source is coupled to power rail 210. The gate of NFET 722 is coupled through pull-up resistor 726 to VCONN pin 204 and to the output of Zener diode 724. Pull-up resistor 726 has a resistance that is suitable for weak pull-up of the NFET gate when voltage is applied on VCONN pin 204. Zener diode 724 is coupled between the gate of NFET 722 and ground. Unlike a normal diode, Zener diode 724 has a highly doped p-n junction that allows current to flow not only from its anode to its cathode, but also in the reverse direction (e.g., when its Zener voltage is reached). In operation, the gate of NFET 722 is controlled by the weak pull-up resistor 726 to the supply voltage provided on VCONN pin 204, and Zener diode 724 prevents the gate voltage from going too high. This allows the input voltage on VCONN pin 204 to be applied to power rail 210 in order to power the internal circuits of core circuitry 208.

Figure 8:
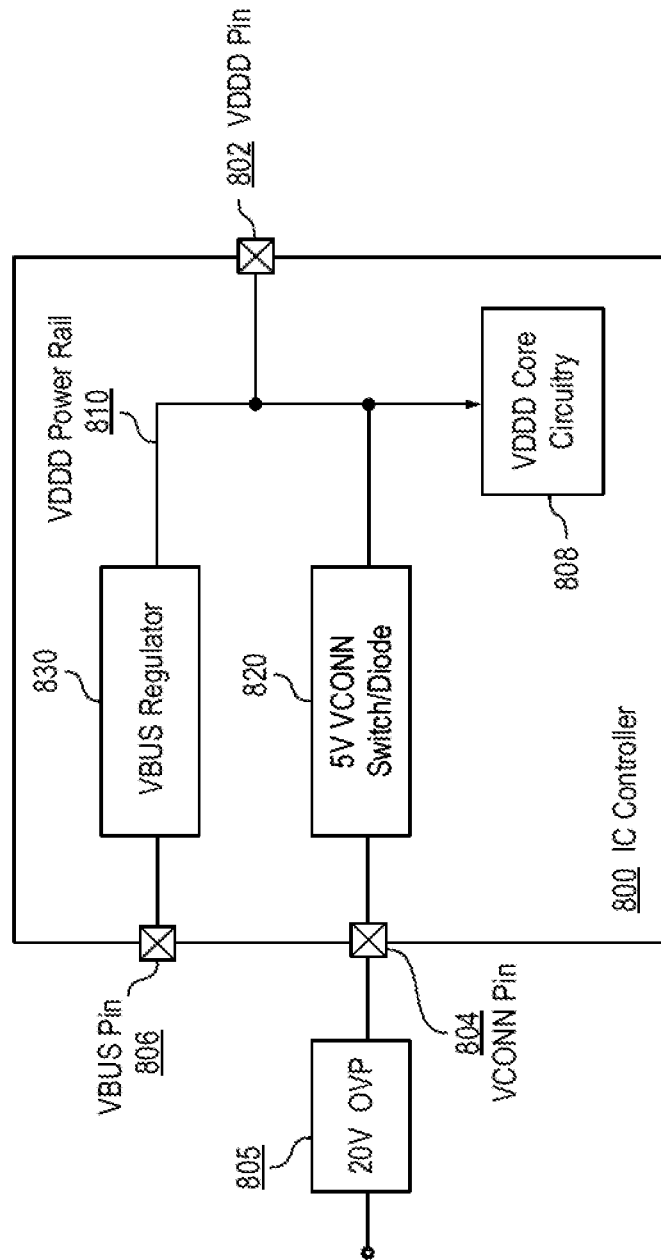
FIG. 8 illustrates a schematic diagram of a power supply architecture with off-chip voltage protection circuits, according to an example embodiment.

In the embodiment of FIG. 7 and/or in other alternative embodiments, an external off-chip OVP circuit may be used to protect the VCONN pin from VBUS short events. FIG. 8 illustrates a schematic diagram of such alternative embodiments, which may be useful for semiconductor manufacturers that have only 5V transistor circuits at their disposal.

In FIG. 8, IC controller 800 includes VDDD pin 802, VCONN pin 804 and VBUS pin 806, which all are coupled (directly or indirectly) to common power rail 810 and are configured to receive input voltage signals for powering core circuitry 808. VCONN switch 820 is coupled between VCONN pin 804 and the common power rail 810. VCONN switch 820 is configured to provide a stable voltage within the VDDD voltage range (e.g., 2.0V-5.5V) to power rail 810. VBUS regulator 830 is coupled between VBUS pin 806 and the common power rail 810. VBUS regulator 830 is configured to convert the input voltage (e.g., in the range 3.0V-24.5V) on VBUS pin 806 to a voltage within the VDDD voltage range (e.g., 2.0V-5.5V) that is required on power rail 810.

An external off-chip OVP circuit 805 is provided to connect VCONN pin 804 to the VCONN power supply (not shown). OVP circuit 805 includes a low-resistance switch that prevents a high voltage IR drop, which allows VCONN switch 820 to operate normally in the 5V range. When a VBUS short event occurs in operation, the VCONN supply path is shut off by OVP circuit 805, thereby providing high-voltage protection to VCONN switch 820 and the internal circuits of core circuitry 808.

Various embodiments of the USB-C power supply architecture described herein may include various operations. These operations may be performed and/or controlled by hardware components, digital hardware and/or firmware, and/or combinations thereof. As used herein, the term "coupled to" may mean connected directly or connected indirectly through one or more intervening components. Any of the signals provided over various on-die buses may be time multiplexed with other signals and provided over one or more common on-die buses. Additionally, the interconnection between circuit components or blocks may be shown as buses or as single signal lines. Each of the buses may alternatively be one or more single signal lines and each of the single signal lines may alternatively be buses.

Certain embodiments may be implemented as a computer program product that may include instructions stored on a non-transitory computer-readable medium, e.g., such as volatile memory and/or non-volatile memory. These instructions may be used to program and/or configure one or more devices that include processors (e.g., CPUs) or equivalents thereof (e.g., such as processing cores, processing engines, microcontrollers, and the like), so that when executed by the processor(s) or the equivalents thereof, the instructions cause the device(s) to perform the described operations for USB-C power supply architecture described herein. A computer-readable medium may also include one or more mechanisms for storing or transmitting information in a form (e.g., software, processing application, etc.) that is readable by a machine (e.g., such as a device or a computer). The non-transitory computer-readable storage medium may include, but is not limited to, electromagnetic storage medium (e.g., floppy disks, hard disks, and the like), optical storage medium (e.g., CD-ROM), magneto-optical storage medium, read-only memory (ROM), random-access memory (RAM), erasable programmable memory (e.g., EPROM and EEPROM), flash memory, or another now-known or later-developed non-transitory type of medium that is suitable for storing information.

Although the operations of the circuit(s) and block(s) herein are shown and described in a particular order, in some embodiments the order of the operations of each circuit/block may be altered so that certain operations may be performed in an inverse order or so that certain operation may be performed, at least in part, concurrently and/or in parallel with other operations. In other embodiments, instructions or sub-operations of distinct operations may be performed in an intermittent and/or alternating manner.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative sense rather than a restrictive sense.

What is claimed is:

1. A Universal Serial Bus Type-C (USB-C) cable, the USB-C cable comprising:
   a first integrated circuit (IC) controller coupled to a first VCONN line at a first end of the USB-C cable, the first IC controller comprising:
   a first power rail coupled to internal circuits of the first IC controller; and
   a first VDDD terminal, a first VCONN terminal, and a first VBUS terminal that are coupled to the first power rail, wherein the first VCONN terminal is coupled to the first VCONN line;
   wherein the first power rail is configured to provide operating power to the internal circuits of the first IC controller from the first VCONN terminal; and
   a second IC controller coupled to a second VCONN line at a second end of the USB-C cable, the second IC controller comprising:

a second power rail coupled to internal circuits of the second IC controller; and a second VDDD terminal, a second VCONN terminal, and a second VBUS terminal that are coupled to the second power rail, wherein the second VCONN terminal is coupled to the second VCONN line;

wherein the second power rail is configured to provide operating power to the internal circuits of the second IC controller from the second VCONN terminal.

2. The USB-C cable of claim 1, further comprising:

a first USB-C plug disposed at the first end of the USB-C cable, wherein the first USB-C plug comprises the first VCONN line; and a second USB-C plug disposed at the second end of the USB-C cable, wherein the second USB-C plug comprises the second VCONN line.

3. The USB-C cable of claim 1, wherein:

the first IC controller comprises a first VCONN switch that is coupled between the first VCONN terminal and the first power rail; and the second IC controller comprises a second VCONN switch that is coupled between the second VCONN terminal and the second power rail.

4. The USB-C cable of claim 1, further comprising a ground line that is routed from the first end of the USB-C cable to the second end of the USB-C cable.

5. The USB-C cable of claim 1, further comprising:

a first clock and data recovery (CDR) chip disposed at the first end of the USB-C cable, wherein the first CDR chip is coupled to the first IC controller;

a second CDR chip disposed at the second end of the USB-C cable, wherein the second CDR chip is coupled to the second IC controller;

wherein the second CDR chip is coupled to the first CDR chip over one or more lines of the USB-C cable; and one or more of SSTX lines, SSRX lines, and SBU lines that are routed from the first end to the second end of the USB-C cable through the first CDR chip and the second CDR chip.

6. The USB-C cable of claim 1, wherein the first VCONN terminal of the first IC controller and the second VCONN terminal of the second IC controller are operable to withstand an input voltage of at least 20V.

7. The USB-C cable of claim 1, wherein the first VBUS terminal of the first IC controller and the second VBUS terminal of the second IC controller are configured for an input voltage between 3.0V and 24.5V.

8. The USB-C cable of claim 3, wherein:

the first IC controller further comprises a first VBUS regulator that is coupled between the first VBUS terminal and the first power rail; and the second IC controller further comprises a second VBUS regulator that is coupled between the second VBUS terminal and the second power rail.

9. The USB-C cable of claim 5, wherein the USB-C cable is configured to support a tunneling protocol that provides multiple types of communications.

10. The USB-C cable of claim 9, wherein the multiple types of communications include one or more of PCI-Express (PCI-E) communications, Display Port (DP) communications, and USB 3.0+ communications.

* * * * *